(12) United States Patent
Ferreria et al.

(10) Patent No.: US 7,296,600 B2
(45) Date of Patent: Nov. 20, 2007

(54) VALVE ASSEMBLY AND REFUELING SENSOR

(75) Inventors: David M. Ferreria, Orange, CT (US); John R. Forgue, Cheshire, CT (US); Mark R. Johansen, Wallingford, CT (US)

(73) Assignee: TI Group Automotive Systems, L.L.C., Warren, MI (US)

( * ) Notice: Subject to any disclaimer, the term of this patent is extended or adjusted under 35 U.S.C. 154(b) by 388 days.

(21) Appl. No.: 10/955,298

(22) Filed: Sep. 30, 2004

(65) Prior Publication Data

US 2006/0065324 A1   Mar. 30, 2006

(51) Int. Cl.
B65B 1/30 (2006.01)

(52) U.S. Cl. .............. 141/94; 141/46; 141/59; 141/83; 141/302

(58) Field of Classification Search ........... 141/59, 141/83, 94, 44, 46, 285, 302; 137/199, 43
See application file for complete search history.

(56) References Cited

U.S. PATENT DOCUMENTS 5,579,802 A    12/1996  Tuckey
5,878,725 A *   3/1999  Osterbrink ............... 123/516
6,145,532 A    11/2000  Tuckey et al.
6,199,574 B1 *  3/2001  Harris ..................... 137/199
6,443,190 B1 *  9/2002  Enge ........................ 141/7
6,533,002 B1 *  3/2003  Kobayashi et al. ....... 141/302

* cited by examiner

Primary Examiner—Timothy L. Maust
(74) Attorney, Agent, or Firm—Reising, Ethington, Barnes, Kisselle, P.C.

(57) ABSTRACT

A valve assembly includes a housing having a valve seat defining at least part of a vent passage, a pressure responsive member carried by the housing and defining at least part of a pressure chamber, and a valve carried by the housing and having a closure movable relative to the valve seat between an open position permitting fluid flow through the vent passage and a closed position at least substantially restricting fluid flow through the vent passage. The closure is moved by the pressure responsive member in response to changes in pressure in the pressure chamber. A control passage communicates at one end with a pressure source and at its other end with the pressure chamber and an electrically operated valve is movable from a first position permitting a pressure signal to develop within the pressure chamber and a second position permitting pressure within the pressure chamber to vent.

23 Claims, 3 Drawing Sheets

VALVE ASSEMBLY AND REFUELING SENSOR

FIELD OF THE INVENTION

The present invention relates generally to fuel systems and more particularly to a sensor and valve for detecting a refueling event and venting fuel vapors from a fuel tank.

BACKGROUND OF THE INVENTION

Environmental concerns and governmental regulations require reduced emissions to the atmosphere of volatile hydrocarbon fuel vapors. One source of hydrocarbon fuel vapors is the fuel tanks of vehicles using gasoline or other hydrocarbon fuels. Fuel vapor can escape to the atmosphere during the filling of the tanks and usually even after the tanks are filled. The use of an onboard vapor recovery system to remove excess fuel vapor from the fuel tank is one solution to the problem. Typically, a canister with activated charcoal therein receives fuel vapors through a valve assembly mounted to the fuel tank. The vapor canister communicates with the intake manifold of a vehicle engine for exhausting fuel vapor from the canister during operation. The valve assembly usually has a valve responsive to the level of liquid fuel in the tank that enables the valve to stay open at a sufficiently low fuel level to permit fuel vapors to flow freely from the fuel tank into the canister. As the fuel level rises during filling to approach the desired maximum level of fuel in the tank, a float is raised to close the valve and prevent liquid fuel from flowing through the valve and into the vapor canister.

In certain circumstances it is desirably or required to be able to detect the addition of liquid fuel to the fuel tank. For example, OBD-II tank leak testing requires knowledge of a refilling event for proper testing of tank pressure and leak integrity. Likewise, electronic fuel level control within the fuel tank may also require knowledge of a refueling action such as to control the maximum fuel level obtained during the refueling event and thereby control the automatic shut off of a refueling pump nozzle. It has been previously proposed to sense the refueling event by sensing removal of a fill cap from a fill tube of the fuel tank, or by sensing insertion of a refueling pump nozzle into the fill tube, such as by actuation of a switch on a filler door in the fill tube. These methods require hardware located outside of the fuel tank including the sensors switches and appropriate wiring from the sensor or switches to the control mechanism. Additionally, fuel fill caps can be lost or the vehicle may be operated with the fill cap removed, the fill door may become stuck in an open position at least temporarily, and the integrity of the wires and their connections may become compromised.

SUMMARY OF THE INVENTION

A valve assembly includes a housing having a valve seat defining at least part of a vent passage, a pressure responsive member carried by the housing and defining at least part of a pressure chamber, and a valve carried by the housing and having a closure movable relative to the valve seat between an open position permitting fluid flow through the vent passage and a closed position at least substantially restricting fluid flow through the vent passage. The closure is moved by the pressure responsive member in response to changes in pressure in the pressure chamber. A control passage communicates at one end with a pressure source and at its other end with the pressure chamber and an electrically operated valve is movable from a first position permitting a pressure signal to develop within the pressure chamber and a second position permitting pressure within the pressure chamber to vent.

In one presently preferred implementation, the pressure responsive member is a flexible diaphragm and the pressure chamber is in communication with the interior of the fuel tank in the area normally containing fuel vapor. Changes in the pressure within the fuel tank, such as may be caused by initiation of a refueling event wherein fuel vapor is rapidly displaced by liquid fuel being added to the fuel tank, create an increased pressure in the pressure chamber that acts to displace the diaphragm to open the valve closure and permit the fuel vapor to rapidly vent from the fuel tank. This movement of the diaphragm can be sensed such as by a sensor or switch, to provide an indication that a refueling event is taking place. The electrically operated valve can be actuated to cause a reduction in pressure in the pressure chamber to thereby cause a subsequent movement of the diaphragm that preferably closes the valve closure to at least substantially restrict fluid flow through the vent passage. In traditional automotive fuel systems, the pressure within the fuel tank may then rapidly rise causing liquid fuel to back up or fill a fill tube and cause an automatic shut off a refueling pump nozzle, as is generally known in the art.

Accordingly, in this implementation, the refueling event can be sensed by movement of the diaphragm due to an increase in tank pressure acting on the diaphragm and the refueling even can be terminated by actuation of the electrically operated valve which moves the valve closure onto the valve seat and may also return the diaphragm to its unflexed or starting position.

According to one presently preferred aspect of the present invention, a method of sensing a refueling event is provided. The method includes the steps of disposing a pressure responsive member in communication with a fuel tank so that the pressure responsive member is movable in response to a pressure in the fuel tank above a threshold pressure, sensing movement of the pressure responsive member, providing a signal in response to movement of the pressure responsive member, and receiving the signal to indicate the occurrence of a refueling event.

Objects, features and advantages of at least some presently preferred embodiments of the present invention include providing accurate indication of a refueling event, sensing a refueling event with in-tank components, facilitating fuel tank pressure and leak testing, facilitating electronic fill level control, providing a relatively rapid venting of fuel from the fuel tank during a refueling event, and providing a valve assembly that is of a relatively simple design, and economical manufacture and assembly, and has a long and useful in-service life.

BRIEF DESCRIPTION OF THE DRAWINGS

These and other objects, features and advantages of the present invention will be apparent from the following detailed description of the preferred embodiments and best mode, appended claims and accompanying drawings in which:

DETAILED DESCRIPTION OF THE PREFERRED EMBODIMENTS

Figure 1:
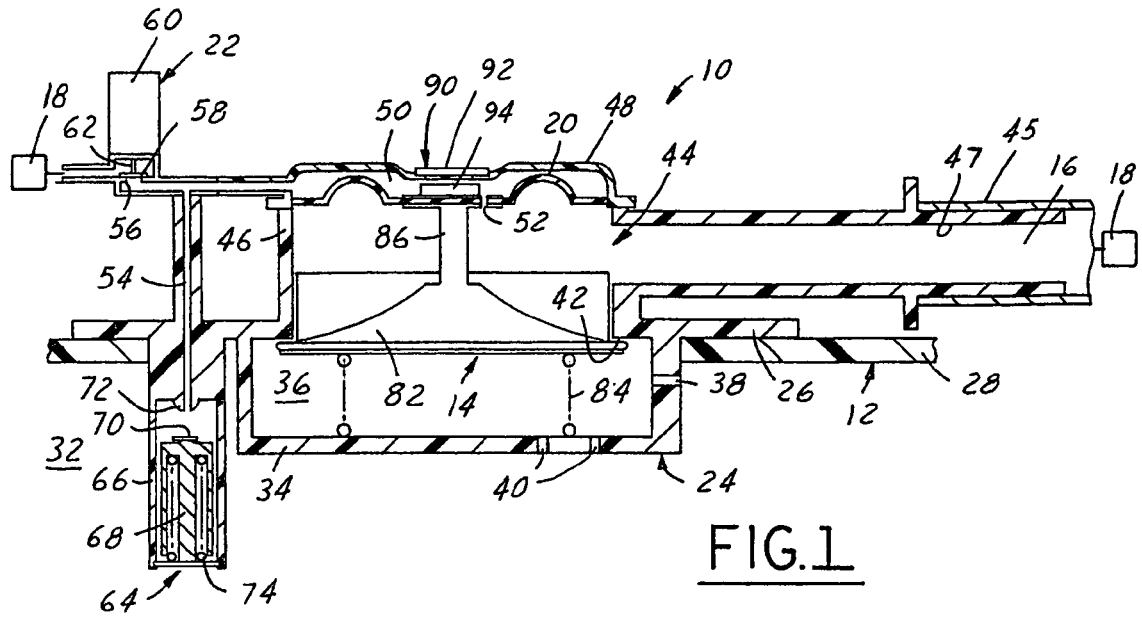
FIG. 1 is a fragmentary sectional view of a valve assembly according to one presently preferred embodiment of the invention.

Referring in more detail to the drawings, FIGS. 1-4 illustrate one presently preferred embodiment of a valve assembly 10 such as for a vehicle fuel system that includes a refueling sensor to determine when fuel is being added to a fuel tank 12 of the fuel system. The assembly 10 includes a vent valve 14 that selectively opens a vent outlet 16 to permit fuel vapor within the fuel tank 12 to be vented from the fuel tank 12, such as to a fuel vapor canister 18 or other fuel vapor receiver. The valve 14 is preferably coupled to a pressure responsive member 20, such as a flexible diaphragm, and is movable in response to a pressure signal applied to the pressure responsive member 20. Desirably, an electronic valve 22 controls application of a pressure signal to the pressure responsive member 20 to thereby control movement of the pressure responsive member 20 and hence, of the valve 14. A sensor, switch or other device may be associated with the valve 14 or the pressure responsive member 20 so that movement of one or both of them can be detected at least in part to determine when fuel is being added to the fuel tank.

The electronic valve 22 may also be operable to control movement of the valve 14, such as to close the valve and prevent further venting of the fuel tank. With the valve 14 closed during a refueling event, the pressure within the fuel tank 12 will rise to cause a termination of the refueling event such as by causing liquid fuel to actuate an automatic shut-off of a refueling pump nozzle. Accordingly, in one presently preferred implementation the system both determines the occurrence of a refueling event, and can control termination of the refueling event to control the maximum fill level achieved during refueling, among other things.

The valve assembly 14 includes a valve body 24 having a radially outwardly extending flange 26 adapted to overlie and be sealed or otherwise connected to a wall 28 of a fuel tank 12. A depending, cylindrical sidewall 30 extends generally axially from the flange 26 and preferably is adapted to be disposed within an interior volume 32 of the fuel tank 12. The sidewall 30 preferably terminates at a bottom wall 34 spaced axially from the flange 26 and defining at least part of a vent chamber 36. The sidewall 30 preferably includes one or more openings 38 through which vapor may enter the vent chamber 36 from the fuel tank 12. The valve body 24 and related components preferably define a convoluted or serpentine path to permit gaseous fluid flow but greatly inhibit or prevent liquid fuel from flowing through the vent outlet 16. The bottom wall 34 preferably has one or more openings 40 therethrough to permit any liquid fuel which accumulates or finds its way into the vent chamber 36 to drain back into the fuel tank 12. An appropriate valve or valves (not shown) may be employed to control the fluid flow through the openings 40, as desired. Axially spaced from the bottom wall 34, a valve seat 42 is defined by the valve body 24. The valve seat 42 defines part of a vent passage 44 that is in communication with a vent outlet 16 preferably also defined by the body 24 and preferably including a nipple or stem 47 adapted to receive a fluid conduit 45 leading to the fuel vapor canister 18 or other fuel vapor receiver.

The valve body 24 may also include a cylindrical projection 46 extending generally axially from the flange 26 and defining at least a portion of the vent passage 44. A cover 48 is preferably secured to the valve body 24, and preferably is secured in the area of or onto the projection 46. A pressure responsive member, such as a flexible diaphragm 20 is preferably carried by the valve 14 and may have its periphery trapped between the valve body 24 and the cover 48. On one side, the diaphragm 20 defines part of a pressure chamber 50 with the cover 48, and on its other side, the diaphragm 20 preferably defines part of the vent passage 44. A vent 52 is preferably provided through the diaphragm 20 providing a controlled flow rate of fluid between the pressure chamber 50 and vent passage 44.

Figure 4:
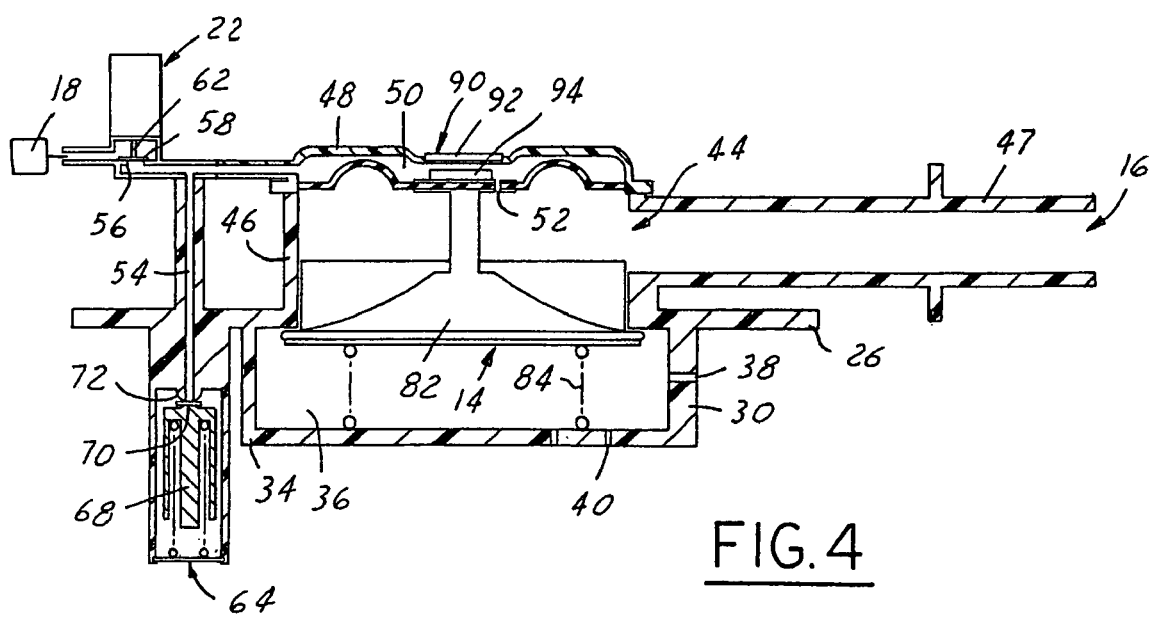
FIG. 4 is a view similar to FIG. 3 illustrating the valve assembly in its open position such as during a refueling event in a fuel tank.

A secondary vent passage 54 communicates with the interior 32 of the fuel tank 12 at one end and with the pressure chamber 50 at its other end. The secondary vent passage 54 may also be communicated with the fuel vapor canister 18 or other fuel vapor receiver, through a valve seat 56 that is selectively closed by a valve head 58 of the electrically actuated valve 22. The valve head 58 is preferably movable between a closed position and an open position and preferably is electrically operated, such as by a solenoid 60. As such, the valve head 58 preferably is carried by a plunger 62 of the solenoid valve. In its closed position, the valve head 58 is generally engaged with the valve seat 56 and prevents fluid flow from the secondary vent passage 54 to the vapor canister 18. In its open position, the valve head 16 is preferably removed from the valve seat 56 and permits fluid flow between the vapor canister 18 and both the secondary vent passage 54 and the pressure chamber 50 through the valve seat 46. A second valve 64 may selectively close the secondary vent passage 54, if desired. In the presently preferred implementation, a so-called rollover vent valve 64 is disposed within a depending skirt 66 preferably carried by or formed in the valve body 24. The rollover valve 64 is operable to close the secondary vent passage 54 when the valve 14 is inclined more than a threshold amount, such as may occur during a rollover or inversion of a vehicle in which the valve 14 is used. As best shown in FIG. 4, the rollover valve 64 is preferably also responsive to the level of liquid fuel in the fuel tank 12 and preferably closes the secondary vent passage 54 in the presence of liquid fuel above a threshold level and acting on the rollover valve 64. The valve 64 may include a float 68 buoyant in liquid fuel and may have a closure 70 integral with or carried by the float 68 to engage its valve seat 72. The float 68 may also be yieldably biased towards its closed position by a spring 74, as is known generally in the art, and the spring 74 may assist in maintaining the valve 64 closed even when it is immersed in liquid fuel during a vehicle rollover event.

The main vent valve 14 is carried by the valve body 24 and is movable between open and closed positions to control at least in part the fluid flow through the valve seat 42 and vent outlet 16. The valve 14 preferably includes a closure or valve head 82 movable to a closed position wherein it engages and closes the valve seat 42 to prevent fluid flow therethrough. The valve head 82 preferably is biased to its closed position by a spring 84 or other biasing member disposed between the valve head 82 and the bottom wall 34 so that the valve 14 is normally closed. The valve head 82 is also movable to an open position spaced from the valve seat 42 to permit fluid flow therethrough. The valve head 82 is preferably coupled to a valve stem 86 that in turn is coupled to or associated with the diaphragm 20 so that movement of the diaphragm 20 causes a corresponding movement of the valve head 82 relative to the valve seat at least until the valve head 82 engages the valve seat 42. Accordingly, movement of the valve head 82 between its closed and open positions is controlled at least in part by the effect of gravity on the diaphragm 20, valve stem 86 and valve head 82, the pressure within the pressure chamber 50, the pressure within the fuel tank 12, the pressure within the vent passage 44, the resistance to deflection or movement of the diaphragm 20, and the force of the spring 84 acting on the valve head 82.

A sensor 90, switch or other mechanism is preferably associated with at least one of the diaphragm 20 and valve 14 to determine movement or at least one position of the diaphragm 20 and/or the valve 14. The mechanism 90 may include a base 92 for example including a reed switch and a magnet 94, for example, with the magnet 94 coupled to or carried by the diaphragm 20 and the base or reed switch 92 carried by the cover 48, although other switches or sensors could be used including an optical sensor or switch, a magnet and a hall device, or simple electrical contacts movable between open and closed positions, by way of examples without limitation. In the example of a switch, the switch can be arranged to change state as the valve 14 moves from one position to another.

In operation, as shown in FIG. 1, the valve head 82 is biased to its closed position at least substantially preventing fluid flow through the valve seat 42 and to the vent outlet 16. The electronic valve 22 may also be in its closed position with the valve head 58 closed on its valve seat 56 and preventing significant venting of the fuel tank 12 through the secondary vent passage 54. Minimal venting may occur through the secondary vent passage 54 by way of the pressure chamber 50 and vent opening 52. Desirably, the pressure within the fuel tank 12 during normal vehicle operating conditions is insufficient to significantly move the valve head 82 relative to the valve seat 42 so that the valve head 82 remains generally closed.

Figure 2:
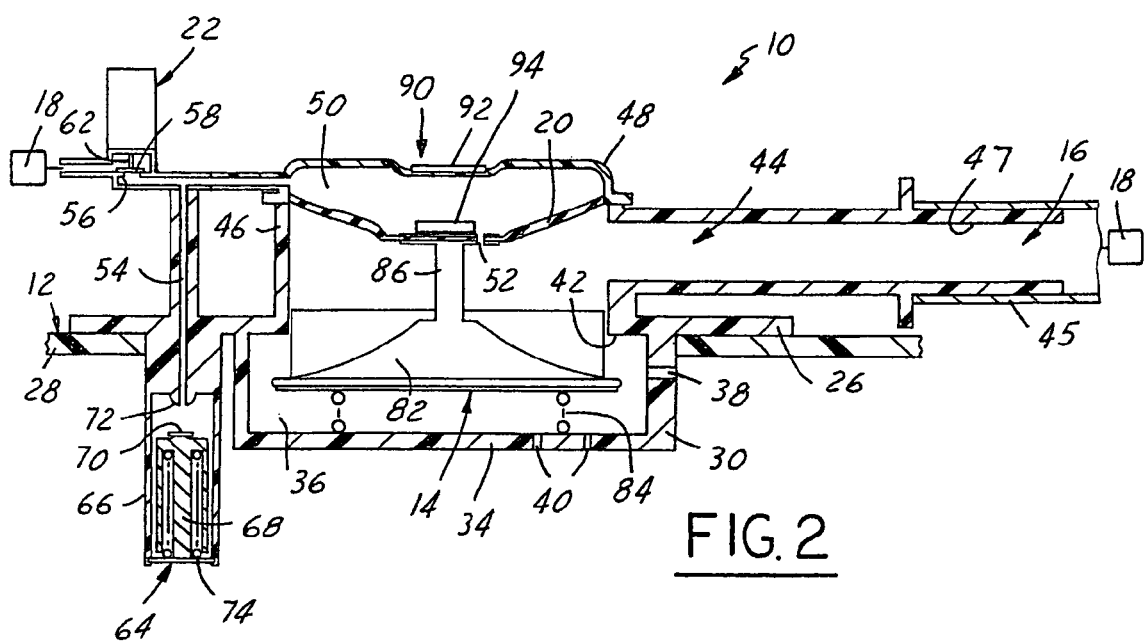
FIG. 2 is a fragmentary sectional view of the valve assembly of FIG. 1 showing the valve in a closed position.

When liquid fuel is added to the fuel tank 12 during a refueling event, a rapid rise in pressure within the tank 12 occurs due to the relatively rapid displacement of gaseous phase fluids from the fuel tank 12. This rise in pressure is communicated to the pressure chamber 50 by way of the secondary vent passage 54 and causes the diaphragm 20 and valve head 82 to move to their second and open positions, as shown in FIG. 2. This permits a relatively rapid fluid flow rate through the valve seat 42 and vent outlet 16 providing a desired venting of the fuel tank 12 during the refueling event. Movement of the diaphragm 20 can be detected by a change in state of the switch, sensor or other mechanism 90, such as by movement of the magnet 94 away from the reed switch 92 in the illustrated embodiment. This, in turn, can be relayed to a controller to indicate the occurrence of the refueling event, and this information may be relayed to other vehicle systems or assemblies as needed. For example, current fuel system regulations require onboard diagnostic testing, such as fuel tank leak testing, and knowledge of a refueling event is important to proper tank leak testing, among other things. Knowledge of a refueling event is also desirable to facilitate electronic fill level control, venting schemes, and/or other fuel system or vehicle schemes or control functions.

Figure 3:
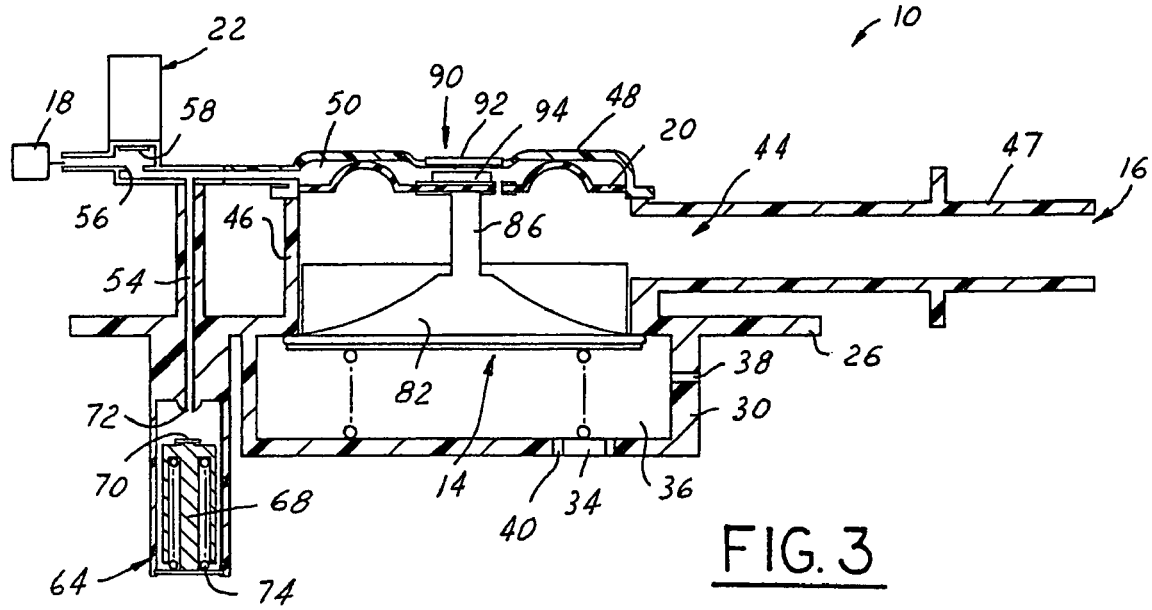
FIG. 3 is a somewhat diagrammatic sectional view of a valve assembly according to an alternate embodiment of the present invention illustrating the valve in its closed position.

The maximum desired fuel level within the fuel tank 12 can be controlled electronically with this valve assembly 14. As best shown in FIG. 3, at or near a desired maximum fill level within the fuel tank 12, the electronic valve 22 can be actuated to move its valve head 58 off its valve seat 56 to thereby communicate the pressure chamber 50 and secondary vent passage 54 with the vapor canister 18. Preferably, the flow rate between the pressure chamber 50 and secondary vent passage 54 is such that the pressure within the pressure chamber 50 is less than that required to move or hold the valve head 82 off of the valve seat 42 so that the valve head 82 closes on the valve seat 42 and prevents significant further venting of the fuel tank 12 through the main valve seat 42. The flow rate through the secondary vent passage 54 is preferably less than the flow rate through the main valve seat 42 so that the pressure within the fuel tank 12 rises sufficiently when the main valve head 82 is closed to cause an automatic shutoff of a refueling pump nozzle and thereby terminate the refueling event.

So-called "trickle filling" or "rounding-up" of the fuel tank 12 can be permitted by closing the valve seat 56 with the electronic valve 22 to permit repressurization of the pressure chamber 50 which opens the valve head 82 and permits additional venting of fuel vapor from the fuel tank 12. Subsequent shutoffs or refueling event terminations can be achieved by again opening the electronic valve 22 to reduce the pressure within the pressure chamber 50 and cause the valve head 82 to close on the valve seat 42 as previously described.

Figure 5:
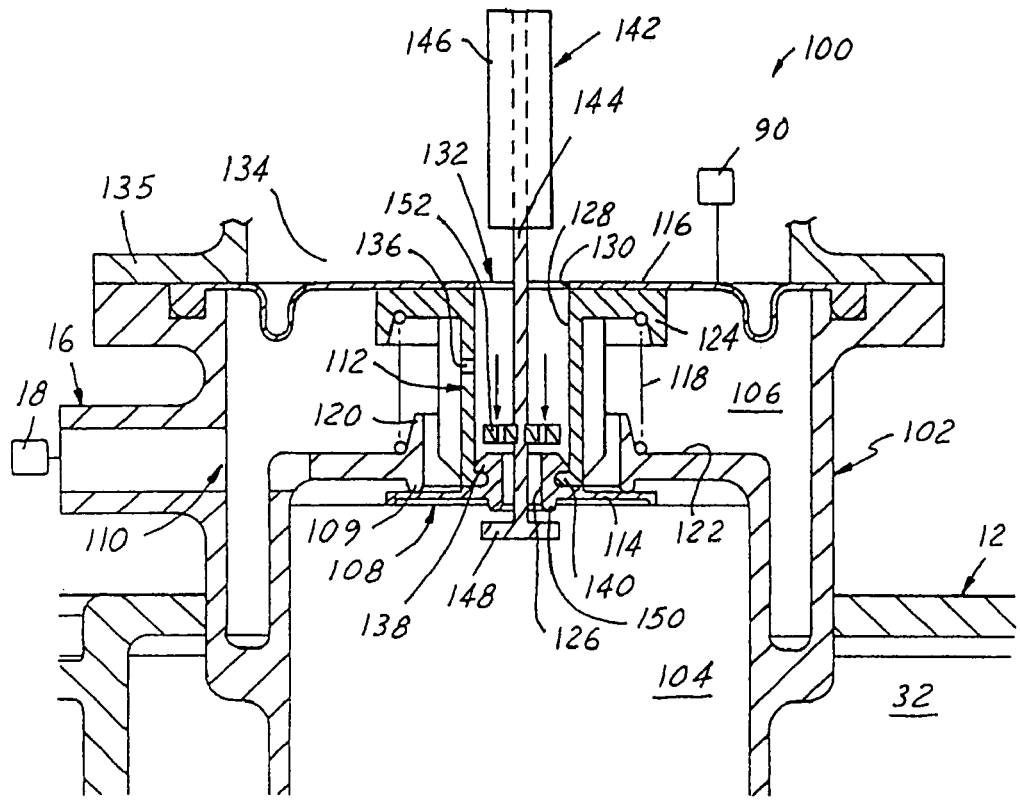
FIG. 5 is a view like FIGS. 3 and 4 illustrating the valve assembly in its closed position to cause a shut off in a refueling event.
Figure 6:
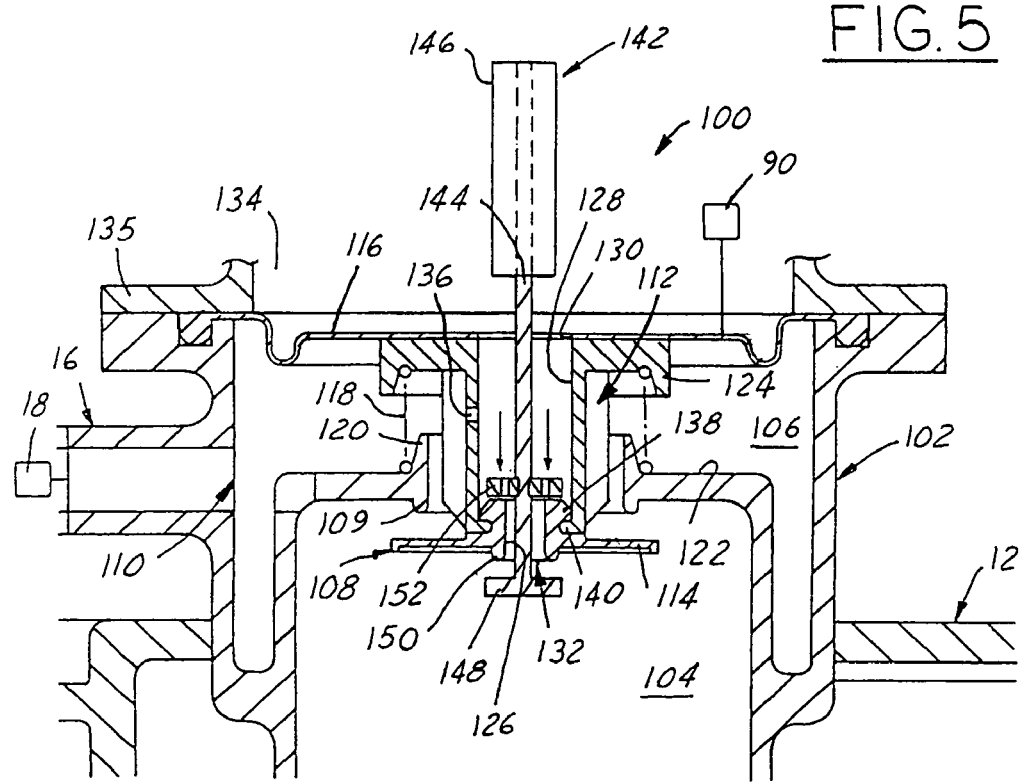
FIG. 6 is a view similar to FIG. 5 illustrating a roll over valve used in combination with the valve assembly in a closed position.

An alternate embodiment valve assembly 100 and refueling event monitor is shown in FIGS. 5 and 6. This valve assembly 100 includes a valve body 102 adapted to be mounted to a vehicle fuel tank 12 and defining a vent chamber 104 in communication with the interior 32 of the fuel tank 12 and separated from a second chamber 106 by a main vent valve 108 and associated valve seat 109. The second chamber 106 communicates or defines in part a vent passage 110 leading to a vent outlet 16 through which fuel vapor exits the valve 100 and is preferably directed to a fuel vapor canister 18 through a suitable conduit.

The main vent valve 108 preferably includes a valve stem or holder 112 that carries a closure or valve head 114 and is operably associated with a pressure responsive member, such as a flexible diaphragm 116, as generally set forth with regard to the first embodiment valve assembly 10. One end of the valve holder 112 is maintained generally adjacent to the diaphragm 116 by a spring 118 disposed around a projection 120 on a valve body upper wall 122 and against a radially outwardly extending flange 124 of the holder 112. The flange 124 may have a generally planar surface that may directly engage or be connected to the diaphragm 116. The holder 112 may also be indirectly engaged or associated with the diaphragm 116, as desired. The valve head 114, holder 112, and diaphragm 116 preferably include aligned bores 126, 128, 130, respectively, that define a secondary vent passage 132 through which the vent chamber 104 is selectively communicated with a pressure chamber 134 defined in part by the diaphragm 116 on its face opposite the valve holder 112 and a cover 135 that traps the diaphragm 116 against the valve body 102. A vent 136 is provided downstream of the main valve head 114, and may be formed in the valve holder 112 or through the diaphragm 116 as desired. The vent 136 communicates the pressure chamber 134 with the vent outlet 16 and preferably is open at all times to permit a controlled flow rate of fluid therethrough. The valve head 114 includes a tubular boss with a radially outwardly extending flange 138 and may be press-fit into the bore 128 in the holder 112 and retained therein by a radially inwardly extending flange 140 of the holder 112.

An electrically operated valve, such as a solenoid valve 142, includes a plunger 144 carried for reciprocation by a solenoid valve body 146 between first and second positions. In its first position, a valve head 148 disposed at one end of the plunger 144 is spaced from a valve seat 150 surrounding the through bore 126 in the valve head 114 to permit fluid flow therethrough. In its second position, the valve head 148 engages the valve seat 150 to prevent or at least substantially restrict fluid flow through the bore 126 in the valve head 114. Accordingly, when the solenoid valve 142 is in its second position the valve head at least substantially prevents communication between the vent chamber 104 and the pressure chamber 134. A clip 152 coupled to the plunger 144 engages one side of the valve head 114 to limit movement of the plunger 144 away from the solenoid valve body 146 but does not significantly inhibit fluid flow through the secondary vent passage 132.

In this embodiment, during normal operation wherein the internal fuel tank pressure is below a threshold value, the main vent valve head 114 is closed on its valve seat 109 closing the main vent outlet and at least substantially restricting the venting of fuel vapor from the fuel tank 12. Nominal or controlled venting of the tank 12 may occur through the secondary vent passage that includes the aligned bores 126, 128, 130 in the valve head 114, valve holder 112 and diaphragm 116, and through the vent 136, which in the illustrated embodiment, is formed in the valve holder 112.

During a refueling event, the pressure within the fuel tank 12 increases relatively rapidly as liquid fuel is added to the tank at a relatively high flow rate and thereby displaces fuel vapor at a relatively high flow rate. Displaced vapor flows through the secondary vent passage 132 into the pressure chamber 134 and acts on and displaces the diaphragm 116 which displaces the valve holder 112 and valve head 114 against the bias of the spring 118 to move the valve head 114 to its open position. In this position, fuel vapor can vent at a relatively rapid rate through the main valve seat 109 and vent outlet 16.

The refueling event can be sensed through an appropriate switch, sensor and/or other mechanism 90 responsive to movement of the diaphragm 116 or other valve component, as described with reference to the first embodiment vent valve 10. Also, movement of the solenoid plunger 144 can be detected by monitoring the position of the plunger 144 or the excitation of a solenoid wire coil of the solenoid valve 142.

To terminate the refueling event, the solenoid valve 142 can be moved to its second position closing the valve head 148 on its valve seat 150 and thereby preventing or substantially restricting communication between the vent chamber 104 and the pressure chamber 134. The fuel vapor within the pressure chamber 134 vents through the vent opening 136, and the pressure within the pressure chamber 134 decreases allowing the main valve head 114 to return to its closed position under the force of the spring 118 to thereby prevent further venting of fuel vapor from the fuel tank 12. This will cause the pressure within the fuel tank 12 to rise relatively rapidly as the refueling event continues until an automatic shutoff of a refueling pump nozzle occurs to terminate the refueling event. In addition to the force of the spring 118, the main valve head 114 may be returned to its closed position with the force of the solenoid valve 142 it is moved to its second position. Trickle fill or so-called roundup filling of the fuel tank 12 can be permitted by moving the solenoid valve 142 to its first position permitting tank pressure to be applied to the diaphragm 116 from within the pressure chamber 134, thereby reopening the main vent valve 108 and permit further filling of the fuel tank 12. Subsequent refueling event terminations can be accomplished in the same manner previously described.

Accordingly, in this embodiment of the valve assembly 100 the refueling event can be sensed and determined by monitoring the solenoid valve 142, or with an appropriate switch or sensor 90. Also, the assembly 100 can be relatively compact with the secondary vent passage 132 formed in a portion of the main vent valve 108 that is not used for the primary fuel vapor venting. Desirably, the refueling event sensing and vapor venting can occur within a single valve assembly 100 and entirely within or closely adjacent to the fuel tank 12. Desirably, external mechanisms to sense or to terminate the refueling event are not needed. And wiring from fill cap or fill tube sensors are not needed. Further, the increase in pressure in the fuel tank associated with a refueling event is sensed and responded to mechanically, by the pressure responsive member. This avoids the need for continuous or frequent monitoring of the fuel tank pressure and for the need for a fuel tank pressure monitor (such as an OBD-II tank pressure sensor) to respond to a positive pressure of the magnitude associated with a refueling event.

While certain preferred embodiments have been shown and described, persons of ordinary skill in this art will readily recognize that the preceding description has been set forth in terms of description rather than limitation, and that various modifications and substitutions can be made without departing from the spirit and scope of the invention. By way of example without limitation, while the main vent valve 14, 108 in both described embodiments has been set forth as normally closed, it may be normally open, and for example, further opened or moved by the increase in pressure associated with a refueling event. Of course, still other modifications and substitutions can be made. The invention is defined by the following claims.

The invention claimed is:

1. A vent valve for a fuel tank of a vehicle, comprising:
   a housing having a valve seat defining at least part of a vent passage;
   a pressure responsive member carried by the housing and defining at least part of a pressure chamber;
   a valve carried by the housing and having a closure movable relative to the valve seat between an open position permitting fluid flow through the vent passage and a closed position at least substantially restricting fluid flow through the vent passage, the closure being moved by the pressure responsive member in response to changes in pressure in the pressure chamber;
   a control passage communicating the pressure chamber with the interior of the fuel tank; and
   a sensor associated with at least one of the pressure responsive member and the valve, the sensor being responsive to a change in position of at least one of the pressure responsive member and the valve and operable to send an electric signal in response to said change in position.

2. The valve of claim 1 which also comprises an electrically operated valve movable from a first position permitting a pressure signal to develop within the pressure chamber and a second position permitting pressure within the pressure chamber to vent.

3. The valve of claim 1 wherein the pressure responsive member is a diaphragm that moves the valve in response to a change in pressure in the pressure chamber.

4. The valve of claim 3 wherein the diaphragm moves the closure to its open position in response to a pressure in the pressure chamber above a threshold value.

5. The valve of claim 4 wherein the valve is yieldably biased to position the closure in its closed position when the biasing force is greater than the force on the valve from the diaphragm.

6. The valve of claim 1 wherein the electrically operated valve moves the closure to its closed position when the electrically operated valve moves to its second position.

7. The valve of claim 6 wherein the electrically operated valve includes a solenoid and a plunger movable between first and second positions by the solenoid and operably associated with the valve to move the valve as the plunger is moved to its second position.

8. The valve of claim 1 which also comprises a valve seat defining at least part of said control passage and wherein said electrically operated valve selectively closes the valve seat to prevent fluid flow through the valve seat.

9. The valve of claim 8 wherein said electrically operated valve closes the valve seat to permit an increased pressure to develop in the pressure chamber and opens the valve seat to dissipate pressure from the pressure chamber.

10. The valve of claim 9 wherein the valve seat is disposed between the pressure chamber and a vent and when the valve seat is open it communicates the pressure chamber with the vent.

11. The valve of claim 10 wherein the vent includes a fuel vapor canister.

12. The valve of claim 8 wherein said electrically operated valve permits fluid flow into the pressure chamber to permit an increased pressure to develop in the pressure chamber, and closes the valve seat to dissipate pressure from the pressure chamber.

13. The valve of claim 12 wherein the valve seat is disposed between the pressure source and pressure chamber.

14. The valve of claim 13 which also includes a vent communicating with the pressure chamber downstream of the valve seat.

15. The valve of claim 1 wherein the sensor includes a switch having first and second states and being switched between these states by movement of at least one of the pressure responsive member and the valve.

16. The valve of claim 15 wherein the switch includes a magnet and a base and the proximity of the magnet to the base determines the state of the switch.

17. The valve of claim 15 wherein the switch includes a pair of electrical contacts with at least one of the electrical contacts being movable relative to the other to selectively engage the contacts in response to movement of at least one of the pressure responsive member and the valve.

18. The valve of claim 7 which also comprises a sensor responsive to movement of the plunger.

19. A method of sensing a refueling event in a fuel tank, comprising the steps of:

disposing a pressure responsive member in communication with the interior of a fuel tank so that the pressure responsive member is exposed to fuel vapor in the fuel tank and is movable in response to a pressure in the fuel tank above a threshold pressure;

providing a vent valve communicating with the fuel tank and movable to open and closed states, the vent valve being normally closed and moved to its open state by the pressure responsive member when the pressure in the fuel tank is above the threshold pressure;

sensing movement of the pressure responsive member;

providing an electric signal in response to movement of the pressure responsive member to open the vent valve; and receiving said electric signal to indicate the occurrence of a refueling event as a function of increased pressure in the fuel tank such as occurs due to the displacement of fuel vapor in the tank by liquid fuel being added to the fuel tank.

20. The method of claim 19 which also comprises the step of relieving the pressure signal acting on the pressure responsive member to permit the pressure responsive member to return to its closed position.

21. A method of sensing a refueling event in a fuel tank for a vehicle, comprising the steps of:

providing a vent valve in fluid communication with the interior of a fuel tank and movable to open and closed states;

providing a pressure responsive member in fluid communication with the interior of the fuel tank and movable to change the state of the vent valve in response to a pressure of fuel vapor in the fuel tank above a threshold pressure;

providing an electric sensor producing an electric signal in response to movement of at least one of the vent valve and the pressure responsive member to change the state of the vent valve; and receiving the electric signal to indicate the occurrence of a refueling event as a function of an increase in pressure of fuel vapor in the fuel tank to above the threshold pressure such as occurs in the fuel tank by liquid fuel being added to the fuel tank.

22. The method of claim 21 which also comprises when the pressure in the fuel tank is above the threshold pressure, relieving the pressure acting on the pressure responsive member to below the threshold pressure to change the state of the vent valve.

23. The method of claim 21 wherein the vent valve is normally in its closed state and is moved by the pressure responsive member to its open state when the pressure in the fuel tank rises above the threshold pressure due to liquid fuel being added to the fuel tank.

* * * * *

UNITED STATES PATENT AND TRADEMARK OFFICE
CERTIFICATE OF CORRECTION

PATENT NO. : 7,296,600 B2  Page 1 of 1
APPLICATION NO. : 10/955298
DATED : November 20, 2007
INVENTOR(S) : David M. Ferreira et al.

It is certified that error appears in the above-identified patent and that said Letters Patent is hereby corrected as shown below:

On Title Page Item 75

Please correct the spelling of "David M. Ferreria" to -- David M. Ferreira --.

Signed and Sealed this

Eighth Day of April, 2008

JON W. DUDAS
*Director of the United States Patent and Trademark Office*